US008027851B1

(12) United States Patent
Krishnan et al.

(10) Patent No.: US 8,027,851 B1
(45) Date of Patent: Sep. 27, 2011

(54) PERSONALIZING ELIGIBILITY AND BENEFITS RESPONSES BASED ON USER PROFILES

(75) Inventors: Gopal Krishnan, Austin, TX (US); Russell Scott, Austin, TX (US); Amrish Chaubal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 11/336,455

(22) Filed: Jan. 20, 2006

(51) Int. Cl.
*G06Q 40/00* (2006.01)
(52) U.S. Cl. .......................................... 705/4
(58) Field of Classification Search .............. 705/2, 4
See application file for complete search history.

(56) References Cited

U.S. PATENT DOCUMENTS

| | | | | |
|---|---|---|---|---|
| 6,035,276 | A | * | 3/2000 | Newman et al. ............. 705/2 |
| 7,490,049 | B2 | * | 2/2009 | Miller et al. ............... 705/3 |
| 2003/0220817 | A1 | * | 11/2003 | Larsen et al. .............. 705/2 |

OTHER PUBLICATIONS

AFEHCT, Putting the Standards to work. Walt Culbertson. Nov. 20, 2003 [online] [retrieved on Jan. 26, 2010] Retrieved from www.archive.org through the Internet <URL: http://web.archive.org/web/20040819010204/www.afehct.org/pastmeetings/november2003/index.htm>.*

Netilla Networks White Paper: The Future of Secure Application Access Management. Copyright 2003. [online] [retrieved on Jan. 26, 2010] Retrieved from the Internet <URL: http://www.netilla.com/downloads/esslm.pdf>.*

Webify website dated Jul. 24, 2004. [online] [retrieved on Jan. 25, 2010] Retrieved from www.archive.org through the Internet <URL: http://web.archive.org/web/20040724230108/www.webifysolutions.com/technology_smartnode.html>.*

* cited by examiner

*Primary Examiner* — Jason M Borlinghaus
(74) *Attorney, Agent, or Firm* — Stevens & Showalter LLP

(57) ABSTRACT

An eligibility and benefits (EB) personalization engine, metadata storage and a portal Web page are set up on a server. EB personalization profiles are set up and stored in metadata storage that specify, according to useful descriptors, personalized information that identifies the EB data of insurance companies that is relevant to particular health care providers. An EB filtering rules database is created to store the filtering rules of multiple insurance companies, where the rules are categorized by the same descriptors used in the EB personalization profiles. After receiving a provider's specific request for an insurance company's EB data for a patient's treatment, the EB personalization engine receives the full collection of EB data from the insurance company, uses the provider's EB profile and the EB filtering rules to select the correct EB data for the provider, and sends the provider that selected data.

19 Claims, 5 Drawing Sheets

Useful descriptors
600

Benefit text
622

Place of service
624

Type of service
626

Provider specialty
628

Age group
630

Fig. 4

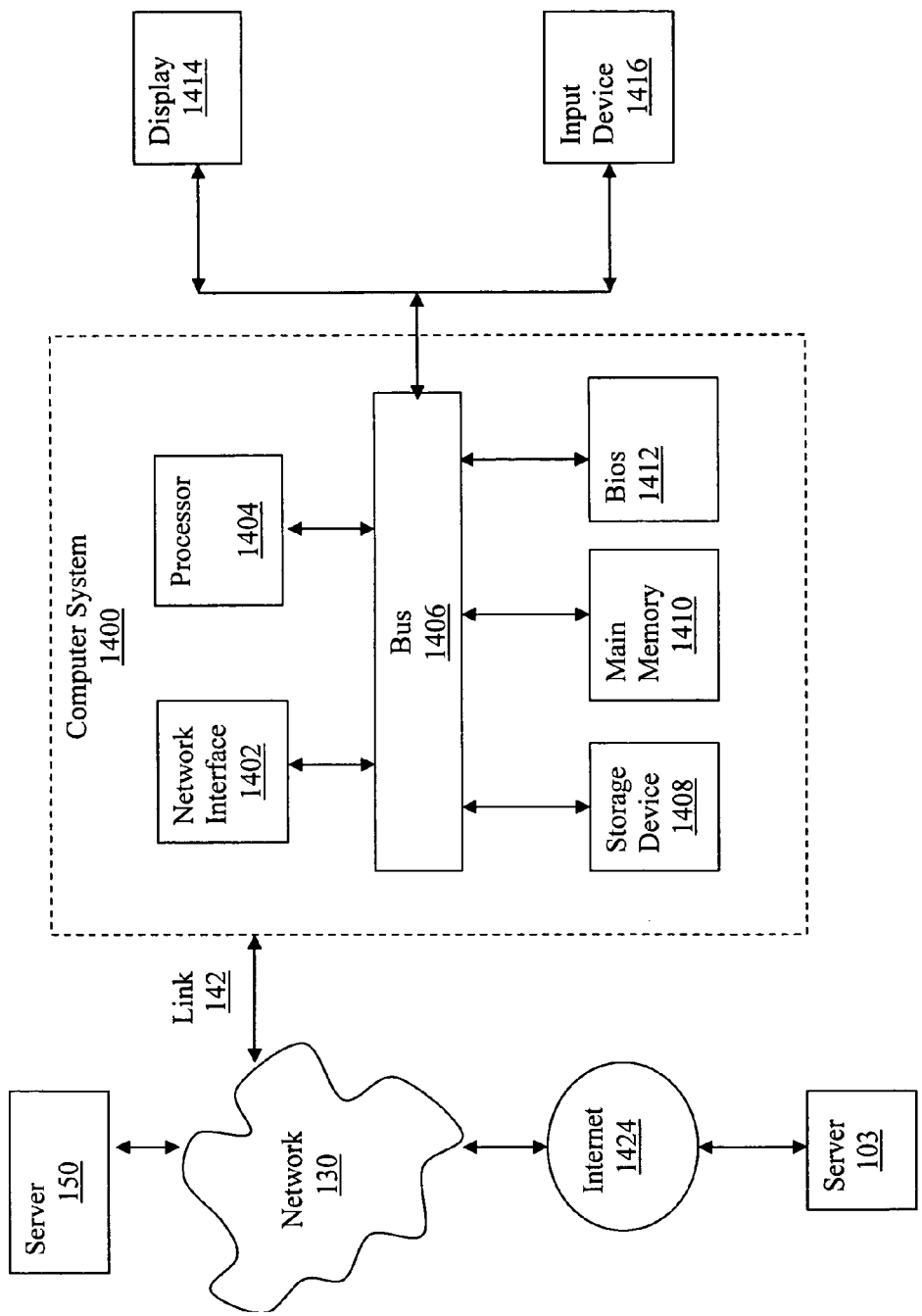

PERSONALIZING ELIGIBILITY AND BENEFITS RESPONSES BASED ON USER PROFILES

CROSS-REFERENCE TO RELATED APPLICATIONS

This application claims the benefit of Provisional Patent Application No. 60/654,167 filed Feb. 19, 2005, by the present inventors.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright whatsoever.

FIELD OF THE INVENTION

This innovation relates to electronic methods that supply insurance company eligibility and benefits data, and, more particularly, to automated methods that supply the particular sets of insurance company eligibility and benefits data applicable for a patient or subscriber to particular health care providers.

BACKGROUND OF THE INVENTION

For speed of communications and cost effectiveness, individuals, businesses, and other organizations frequently exchange electronic data through e-mail, the Internet, and other networks and systems. For example, health-care providers such as medical clinics and hospitals typically communicate over the Internet with insurance companies to determine the eligibility for insurance coverage of patients seeking health care treatment. The insurance companies, which are the final payers of patients' claims for insurance coverage, and the providers may communicate directly, or the insurance companies may use intermediaries for processing information from providers.

FIG. 1 shows a typical operating environment through which providers and payers can communicate over a network, using an intermediary if necessary. Servers 100, 150, 160, 170, and 180 can communicate via a wired or wireless network 130, and wired or wireless links 142, 144, 145, 146, and 148. The servers 100, 150, 160, 170, and 180 may be personal computers or larger computerized systems or combinations of systems. The network 130 may be the Internet, a private LAN (Local Area Network), a wireless network, a TCP/IP (Transmission Control Protocol/Internet Protocol) network, or other communications system, and can comprise multiple elements such as gateways, routers, and switches. Links 142, 144, 145, 146, and 148 use technology appropriate for communications with network 130.

For example, an operator at a hospital at provider server 1 150 can employ a user interface UI 1 310, such as a screen on a computer terminal, to request information about eligibility and benefits data for a patient from the patient's insurance company at payer server 1 170 through the insurance company's user interface UI 3 330. An operator at payer server 1 170 can then employ user interface UI 3 330 to send the requested information to an operator at provider server 1 150 through user interface UI 1 310. Alternately such information can also be exchanged through machine to machine transmission instead of through operator-controlled screens.

Moreover, an insurance company such as the one at payer server 1 170 can use a service on another server, such as server 1 100, as an intermediary for processing provider requests and sending requested information back to providers.

In such a system, additional providers, such as a clinic at provider server 2 160, and payers, such as an insurance company at payer server 2 180, can further communicate information about the insurance coverage for different treatments and different patients.

It is important to note, however, that an insurance company typically has a large amount of different eligibility and benefits data depending on the category of health care provided to a patient. For example, an insurance company may have different eligibility requirements, co-payments, and amounts of coverage for treatments covering psychiatry, neurology, dermatology, and urgent care such as emergency room treatment. Moreover, patients' coverage may change depending on whether they receive treatment from private clinics or from hospitals and on whether the providers are in-network or out-of-network according to an insurance company's plan.

Typically, an insurance company cannot identify the category of coverage associated with a particular provider's request for eligibility and benefits data and sends a collection of all its eligibility and benefits data to the provider. This means that the provider must then manually read through the entire collection of data to identify the specific information that applies to a particular patient's treatment, which is unnecessarily laborious, expensive, and time consuming.

Therefore there is a need for a method and system that provides a more automatic method to supply only that eligibility and benefits data from an insurance company that applies to a particular health care provider's circumstances.

BRIEF SUMMARY OF THE INVENTION

It is an object of the present invention to provide an automatic method to supply only that eligibility and benefits data from an insurance company that applies to a particular health care provider's circumstances.

This and other needs are addressed by the present invention. The following explanation describes the present invention by way of example and not by way of limitation.

In accordance with the present invention, an eligibility and benefits (EB) personalization engine hereinafter also referred to as an eligibility personalization engine, metadata storage and a portal Web page are set up on a server. Eligibility personalization profiles are set up and stored in metadata storage that specify, according to useful descriptors, personalized information that identifies the eligibility data of insurance companies that is relevant to particular health care providers. For example eligibility profiles may be set up and maintained as policies in association with the PRISM™ engine created by Webify Solutions, Inc.

An EB filtering rules database is created to store the filtering rules of multiple insurance companies, where the rules are categorized by the same descriptors used in the EB personalization profiles. In one embodiment, the eligibility personalization engine may use the PRISM™ engine to interpret the rules. The PRISM™ (Performance, Reliability, Interoperability, Security, and Manageability) Engine by Webify Solutions, Inc. provides semantic brokering and dynamically provisions and personalizes local and remote business services based on contract, context, and content. Specifically, the PRISM Engine leverages explicit semantics of business services to enable looser coupling and more flexible composition of services and data to enable real-time business collaboration within and beyond enterprise and application boundaries.

After receiving a provider's specific request for an insurance company's EB data for a patient's treatment, the EB personalization engine receives the full collection of EB data from the insurance company, uses the provider's EB profile and the EB filtering rules to select the correct EB data for the provider, and sends the provider that selected data.

The health care provider profile parameters, or policies, may be categorized as a plurality of dimensions of personalization, where each dimension may include a plurality of groups of personalization attributes, and each group includes a characterization for the health care provider of desired values or value ranges for the attributes.

BRIEF DESCRIPTION OF THE DRAWINGS

The following embodiment of the present invention is described by way of example only, with reference to the accompanying drawings, in which:

FIG. 4 is a block diagram that illustrates examples of useful descriptors for eligibility and benefits personalization profiles; and FIG. 5 is a block diagram that illustrates a typical computer system, representing a server on which embodiments of the present invention can be implemented.

DETAILED DESCRIPTION

Figure 1:
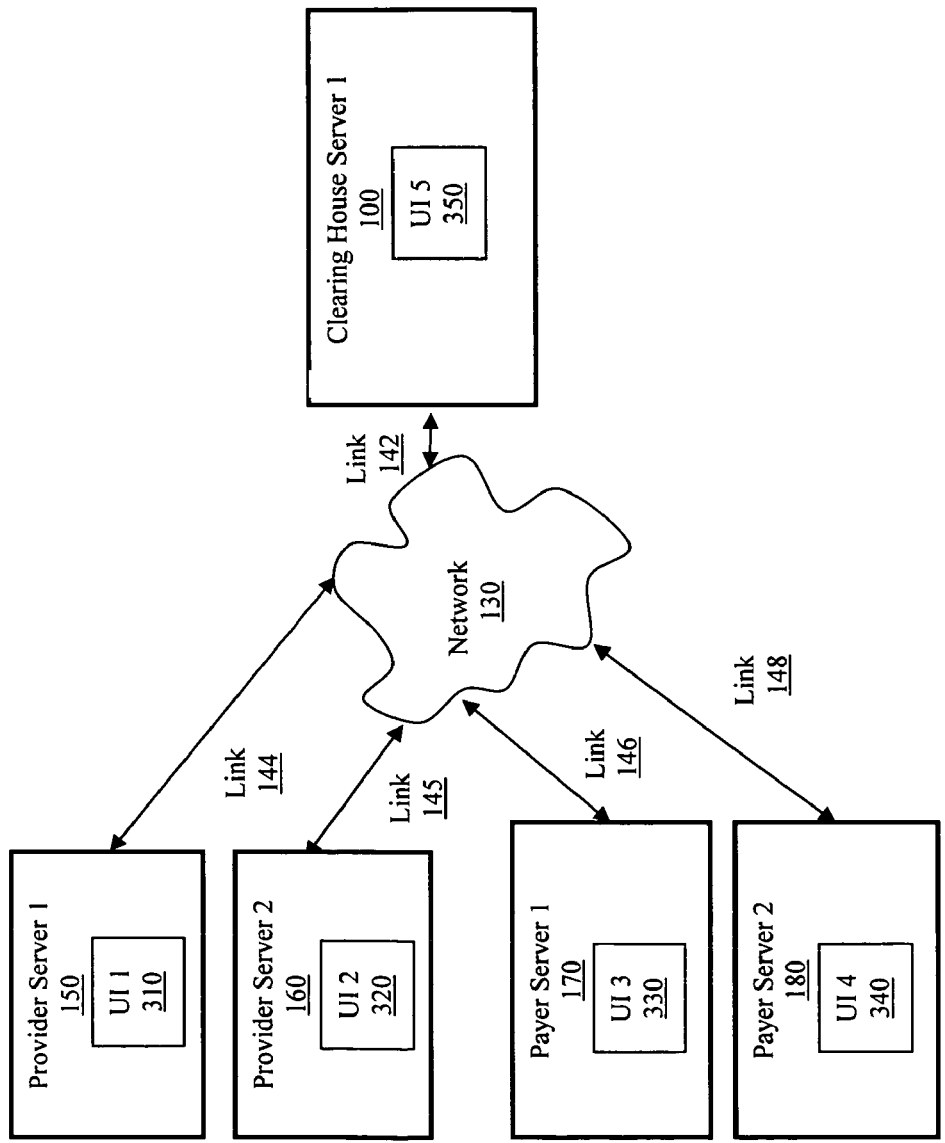
FIG. 1 is a block diagram showing a typical operating environment through which health care providers, insurance companies, and an intermediary can communicate.
Figure 2:
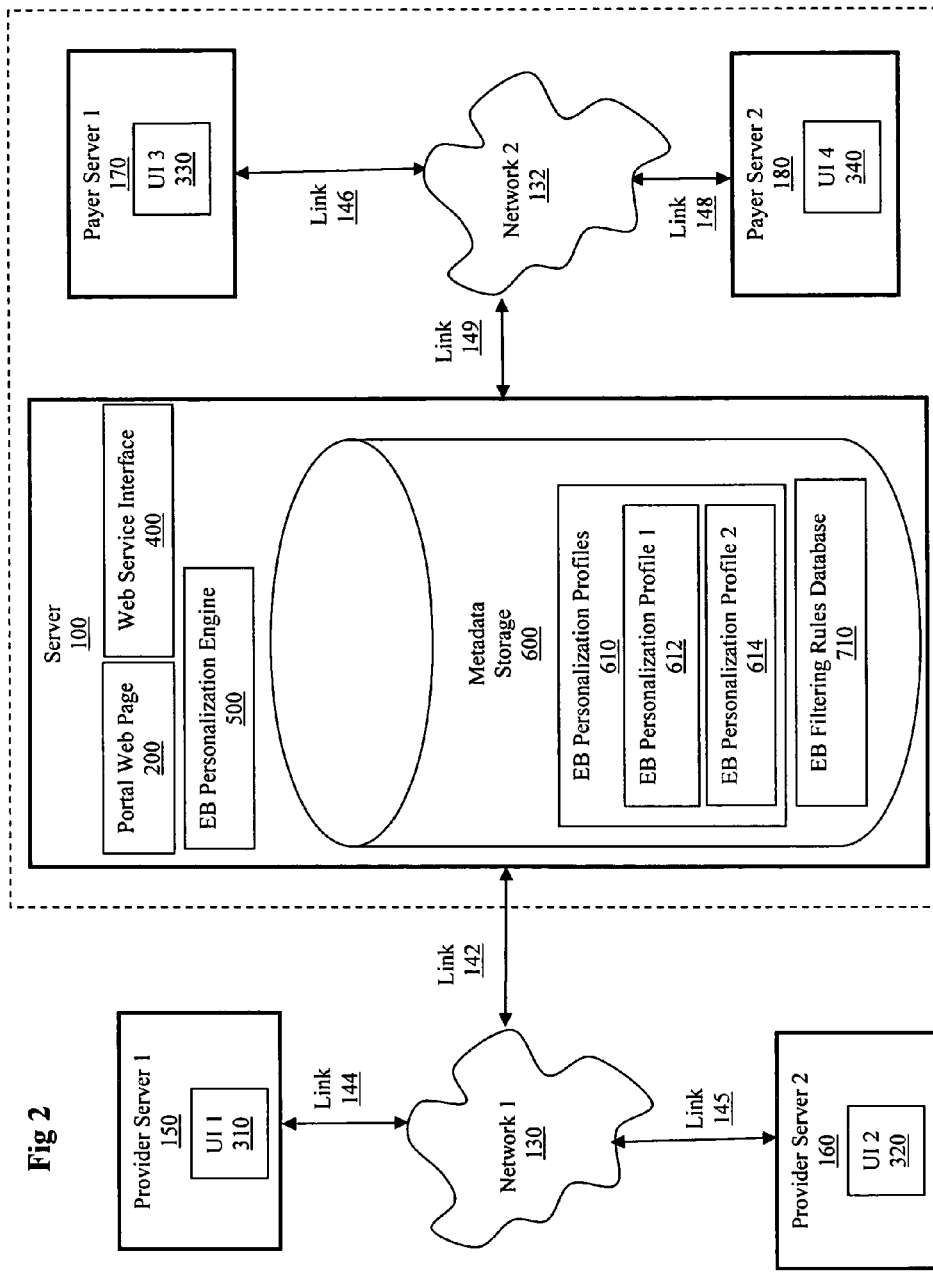
FIG. 2 is a block diagram showing an operating environment in which embodiments of the present invention may be employed.

The following description explains a system and method to automatically provide personalized responses to providers' requests for eligibility and benefits data from insurance companies. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.
Operating Environment An embodiment of the operating environment of the present invention is shown in FIG. 2. A party uses a server 100 to operate a service for insurance companies that are located, for example, at payer server 1 170 and payer server 2 180. Note that in different embodiments payer server 1 170 and payer server 2 180 may be part of a physical system with server 100 or may be separate from server 100.

Server 100 comprises a portal Web page 200, an eligibility and benefits (EB) personalization engine 500, and a metadata storage 600, which can store one or more EB personalization profiles 610, such as EB personalization profile 1 612 and EB personalization profile 2 614.

In an embodiment, server 100 can also comprise an interface, such as a Web service interface 400, to enable machine-to-machine communications with other servers in addition to communications through portal Web page 200.

Server 100 can communicate with servers 170 and 180 via a wired or wireless link 149, a wired or wireless network 2 132, and wired or wireless links 146 and 148. Server 100 can also communicate with provider servers 150 and 160 via a wired or wireless link 142, a wired or wireless network 1 130, and wired or wireless links 144 and 145.

The servers 100, 150, 160, 170, and 180 may be personal computers or larger computerized systems or combinations of systems. The networks 130 and 132 may be the Internet or one or more private LANs (Local Area Network), wireless networks, TCP/IP (Transmission Control Protocol/Internet Protocol) networks, or other communications systems, and can comprise multiple elements such as gateways, routers, and switches. Links 142, 144, 145, 146, 148, and 149 use technology appropriate for communications with networks 130 and 132.

Through the operating environment shown in FIG. 2, a service at server 1 100 can be used to personalize provider requests for eligibility and benefits rules from insurance companies.

Figure 3:
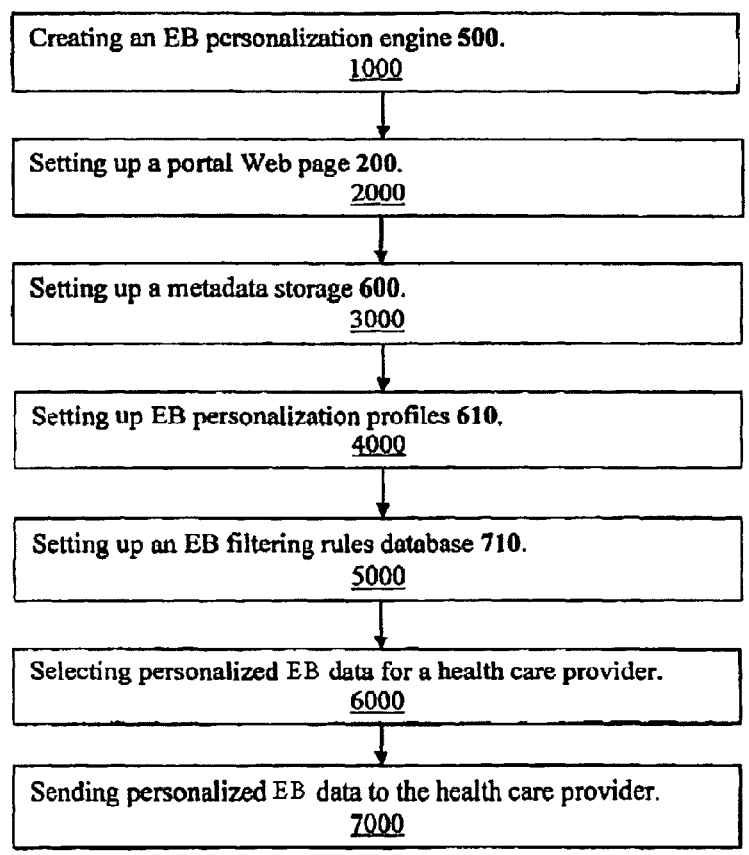
FIG. 3 is a flow chart showing a process by which an embodiment of the present invention may be employed.

In other embodiments the elements on the server 100 may be located separately in more widely dispersed systems involving multiple servers. Moreover, in another embodiment these elements could all be located on a payer's server, such as 170, and used there.
Process The following discussion explains an embodiment of the process that the present invention employs, in an embodiment, to personalize provider requests for eligibility and benefits (EB) data from insurance companies. In an embodiment, the process employs the following main steps, as shown in FIG. 3:

Step 1000—Creating an EB personalization engine 500;
Step 2000—Setting up a portal Web page 200;
Step 3000—Setting up a metadata storage 600;
Step 4000—Setting up EB personalization profiles 610;
Step 5000—Setting up an EB filtering rules database 710;
Step 6000—Selecting EB data for a health care provider; and
Step 7000—Sending personalized EB data to the health care provider.

Step 1000—Creating an EB Personalization Engine

In an embodiment, one or more programmers at a server 100, shown in FIG. 2, create an eligibility and benefits personalization engine 500. An eligibility personalization engine 500 may be a computer software program that
 Manages the application of EB personalization profile parameters to eligibility and benefits data; and
 Sends the personalized data to providers.

Step 2000—Setting Up a Portal Web Page

Portal Web pages are computer-programmed modules that allow end-users to select variables and parameters from easy-to-use visual displays or to type in this input, save the information through selecting a save option, and have their selections automatically applied by computer subsequently, without those users having to program the information manually.

In an embodiment, one or more programmers at server 100, shown in FIG. 2, create a portal Web page 200. Providers can then access portal Web page 200 over the Internet by entering a URL and can employ the portal Web page 200 to set up EB personalization profiles with personalization parameters to be applied automatically to eligibility and benefits data from insurance companies.

For example, an operator at provider server 1 150 could set up an EB personalization profile 612 to indicate that the provider is a hospital section that provides urgent care and that is part of the in-network system of the insurance company at payer server 1 170.

Step 3000—Setting Up Metadata Storage

In an embodiment, one or more programmers at server 100, shown in FIG. 2, create a metadata storage 600. Metadata storage 600 may be non-volatile data storage used to store the personalization parameters supplied by providers through portal Web page 200 in EB personalization profiles 610. In addition, metadata storage 600 provides access to the EB personalization profiles 610 by the eligibility personalization engine 200.

Step 4000—Setting Up EB Personalization Profiles

Eligibility and benefits personalization profiles 610 may be set up and stored in metadata storage 600. Eligibility and benefits personalization profiles 610 specify personalized information about health care providers relevant to the eligibility and benefits rules of insurance companies, according to useful descriptors.

Useful Descriptors

Useful descriptors for setting up EB personalization profiles may comprise any categories of information for classifying health care providers to provide relevant eligibility and benefits data to them from insurance companies. In an embodiment shown in FIG. 4, useful descriptors 620 comprise Benefit text 622

This field contains the inhouse description (up to 31 characters, in ASCII text) of the benefit value being represented in each individual EB loop. For example,

SURGERY

PROF VISIT (ALLERGY, ER, OFFICE)

Emergency Room Visit

Place of service 624

This field contains coded place-of-treatment values. For example,

| POS Code | POS Value |
|----------|-----------|
| I/P | INPATIENT |
| O/P | OUTPATIENT |
| ALL | ALL |
| XPH | ALL EXCEPT PHARMACY |
| PHY | PHARMACY |
| ABY | AMBULATORY |
| SNF | SKILLED NURSING FACILITY |
| XAM | ALL EXCEPT AMBULANCE, AIR AMBULANCE, SEA |

Type of service 626

This field contains coded type-of-service values. For example,

| TOS Code | TOS Value |
|----------|-----------|
| HCP | HOSPICE CARE PROGRAM |
| XPS | ALL EXCEPT: PSYCHIATRIC CARE |
| DRT | DIAG RAD FOR PRE-ADM TESTING, DIAG MED SVC - PRE-ADM TESTING |
| XDR | ALL EXCEPT: DIAG RAD FOR PRE-ADM TESTING |
| HHC | MEDICAL/HOME HEALTH CARE PROGRAM, HOME HEALTH CARE PROGRAM SVCS |
| DRP | DIAG RAD PROFESSIONAL COMP |
| XDP | ALL EXCEPT: DIAG RAD PROFESSIONAL COMP |
| XST | ALL EXCEPT: SURG SVCS TECHNICAL COMPONENT |
| SST | SURGICAL SVCS TECHNICAL COMPONENT |
| XPO | ALL EXCEPT: PROVIDER'S OFFICE |
| XCL | ALL EXCEPT: PROVIDER'S OFFICE INDEPENDENT CLINICAL LAB |
| WBC | WELL BABY/WELL CHILD CARE |
| ALL | ALL |
| CMO | CHEMOTHERAPY |
| XSG | ALL EXCEPT: SURGERY |
| SOS | SURGERY, ORAL SURGERY |

In this example, place or service and type of service represent two dimensions of personalization for eligibility. In the example, the place of service dimension of personalization comprises several groups of personalization attributes including INPATIENT, OUTPATIENT, ALL, ALL EXCEPTPHARMACY, PHARMACY, etc. The type of service dimension of personalization comprises several groups of personalization attributes including HOSPICE CARE PROGRAM; ALL EXCEPT: PSYCHIATRIC CARE; DIAG RAD FOR PRE-ADM TESTING, DIAG MED SVC—PRE-ADM TESTING; ALL EXCEPT: DIAG RAD FOR PRE-ADM TESTING, etc. In this example, the characterization for the appropriate group of personalization attributes for a particular instance could have a specific value such as a particular place of service within the group "OUTPATIENT" and a particular type of service within the group "ALL EXCEPT: PSYCHIATRIC CARE".

One advantage to this structure is that it permits a health care provider to self-personalize its eligibility policies by selecting appropriate groups of personalization attributes with default values; and editing at least one default value in the group of personalization attributes.

Provider specialty 628

This field contains coded entries for various combinations of provider specialties. Each individual code represents a full collection of specialties for each EB loop entry. For example,

| PRV SPC Value | PRV SPC Text |
|---------------|--------------|
| XPS | All Except: PSYCHIATRIC CARE |
| PSG | PSYCHIATRY, PEDIATRIC, ENDOCRINOLOGY, SOCIAL WORKER |
| GPG | GENERAL PRACTICE MD, NEONATAL/PERINATAL MEDICINE, PEDIATRICS |
| OGG | OBSTETRICS/GYNECOLOGY |
| CHG | CHIROPRACTOR |
| XSP | All Except: SCHOOL PSYCHOLOGIST |

Age group 630

This field contains the age range when it applies to a specific EB loop. The first two digits are the low age range, followed by separator, followed by high age range. Single digit values are zero filled (i.e. 06).

The categories in the examples given above are useful for personalization because, for example, insurance companies typically have different eligibility and benefits rules and data for them, covering such elements as Co-payments, Eligibility requirements, Amounts of coverage, and In network/out of network coverage Examples of code used for personalization through descriptors are given below.

Profiles Setup

In an embodiment, one or more operators at server 100, shown in FIG. 2, set up EB personalization profiles 610 for providers and store the profiles in the metadata storage 600. The setup may be done manually or using software tools.

In another embodiment, one or more operators at other servers, such as provider server 1 150 and provider server 2 160, can use portal Web page 200 to manually set up EB personalization profiles 610 in the metadata storage 600 on server 100.

Updating

After an EB personalization profile 612 has been created, the associated health care provider may subsequently use the portal Web page 200 to update the EB personalization profile 612.

Step 5000—Setting Up an EB Filtering Rules Database

In an embodiment, one or more programmers at server 100 collect the eligibility and benefits filtering rules of multiple insurance companies and, manually or using automated software tools, create an eligibility and benefits filtering rules database 710. Insurance companies create eligibility and benefits filtering rules to provide subsets of their eligibility and benefits data to providers.

The eligibility and benefits filtering rules database uses the same descriptors as those used in the EB personalization profiles 610.

Step 6000—Selecting Personalized EB Data for a Health Care Provider

The EB personalization engine 500 can use the EB personalization profile 612 and EB filtering rules database 710 to select personalized EB data for a health care provider.

For example, suppose an EB personalization profile 612 has been stored on server 100 for the provider at provider server 1 150 and a party at provider server 1 150 sends a request to server 100 for eligibility and benefits coverage data for a patient from the insurance company at payer server 1 170.

The EB personalization engine 500 can automatically use EB personalization profile 612 to select the correct set of EB filtering rules provided by the insurance company at payer server 1 170 and stored in the EB filtering rules database 710. The EB personalization engine 500 can then request the full collection of eligibility and benefits data from the insurance company at payer server 1 170. The insurance company at payer server 1 170 then sends the full collection of its eligibility and benefits data to EB personalization engine 500, and EB personalization engine 500 uses the correct set of EB filtering rules for the provider to select the correct set of EB data for the provider.

Step 7000—Sending Personalized EB Data to the Health Care Provider

After selecting the correct set of EB data for the health care provider at provider server 1 150, the EB personalization engine 500 sends that set of EB data to provider server 1 150.

Computer System Overview

FIG. 5 is a block diagram that illustrates an example of a typical computer system 1400, well known to those skilled in the art, representing a server 100, shown in FIG. 2, on which embodiments of the present invention can be implemented. This computer system 1400, shown in FIG. 5, comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:

- a processor 1404 for processing information;
- a storage device 1408, such as an optical disc, a magneto-optical disc, or a magnet disc, for storing information and instructions;
- main memory 1410, which is a dynamic storage device such as a random access memory (RAM) that stores information and instructions to be carried out by processor 1404;
- a bios 1412 or another form of static memory such as read only memory (ROM), for storing static information and instructions to be carried out by processor 1404;
- a display 1414, such as a liquid crystal display (LDC) or cathode ray tube (CRT) for displaying information to user of the computer system 1400; and
- an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data from another computer 150 and server 103 through a network 130 such as the Internet, and appropriate links 142, such as wired or wireless ones, and its network interface 1402. It can of course transmit data back to computers over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile and/or non-volatile media. Volatile media comprise dynamic memory, such as main memory 1410. Non-volatile media comprise magnetic, magneto-optical, and optical discs, such as storage device 1408. Typical examples of widely used computer-readable media are floppy discs, hard discs, magnetic tape, CD-ROMs, punch cards, RAM, EPROMs, FLASH-EPROMs, memory cards, chips, and cartridges. Multiple computer-readable media may be used, known and not yet known, can be used, individually and in combinations, in different embodiments of the present invention.

Alternate Embodiments

It will be apparent to those skilled in the art that different embodiments of the present invention may employ a wide range of possible hardware and of software techniques. For example the communication between servers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among servers.

Furthermore, in the previous description the order of processes, their numbered sequences, and their labels are presented for clarity of illustration and not as limitations on the present invention.

Examples of Code Used for Personalization

Schema for Descriptors

The following example represents a section of code useful for providing a framework for personalized eligibility and benefits profiles and for eligibility and benefits filtering rules in an embodiment.

```
<?xml version="1.0" encoding="UTF-8" standalone="yes"?>
<!--W3C Schema generated by XMLSpy v2005 U (http://www.xmlspy.com)-->
<xs:schema xmlns:xs="http://www.w3.org/2001/XMLSchema" elementFormDefault="qualified">
    <xs:element name="BenefitCode">
        <xs:complexType>
            <xs:sequence>
                <xs:element ref="FilteringLogic" minOccurs="0"/>
            <xs:sequence>
            <xs:attribute name="name" use="required">
                <xs:simpleType>
                    <xs:restriction base="xs:string"/>
                </xs:simpleType>
            </xs:attribute>
            <xs:attribute name="value" use="required">
                <xs:simpleType>
                </xs:simpleType>
                    <xs:restriction base="xs:string"/>
                </xs:simpleType>
            </xs:attribute>
        <xs:complexType>
    </xs:element>
    <xs:element name="BenefitCodes">
        <xs:complexType>
            <xs:sequence>
                <xs:element ref="BenefitCode" maxOccurs="unbounded"/>
            </xs:sequence>
        </xs:complexType>
    </xs:element>
    <xs:element name="BenefitText">
        <xs:simpleType>
            <xs:restriction base="xs:string"/>
        </xs:simpleType>
    </xs:element>
    <xs:element name="FilterRule">
        <xs:complexType>
            <xs:sequence>
                <xs:element ref="BenefitText"/>
                <xs:element ref="POSs" minOccurs="0"/>
                <xs:element ref="ProviderSpeciality" minOccurs"0"/>
                <xs:element ref="BenefitCodes"/>
            </xs:sequence>
        </xs:complexType>
    </xs:element>
    <xs:element name="FilterRules">
        <xs:complexType>
            <xs:sequence>
                <xs:element ref="Plan" maxOccurs="unbounded"/>
            </xs:sequence>
            <xs:attribute name="name" use="required">
                <xs: simpleType>
                    <xs:restriction base="xs:string"/>
                </xs: simpleType>
            </xs:attribute>
        </xs:complexType>
    </xs:element>
    <xs:element name="FilteringLogic">
        <xs:simpleType>
            <xs:restriction base="xs:string"/>
        </xs:simpleType>
    </xs:element>
    <xs:element name="OptionalPOS">
        <xs:complexType>
            <xs:attribute name="name" use="required">
                <xs:simpleType>
                    <xs:restriction base="xs:string"/>
                </xs:simpleType>
            </xs:attribute>
```

-continued

```
            <xs:attribute name="value" use="required">
                <xs:simpleType>
                    <xs:restriction base="xs:string"/>
                </xs:simpleType>
            </xs:attribute>
        </xs:complexType>
    </xs:element>
    <xs:element name="OptionalPOSs">
        <xs:complexType>
            <xs:sequence>
                <xs:element ref="OptionalPOS" maxOccurs="unbounded"/>
            </xs:sequence>
        </xs:complexType>
    </xs:element>
    <xs:element name="POS">
        <xs:complexType>
            <xs:attribute name="name" use="required">
                <xs:simpleType>
            <xs:restriction base="xs:string"/>
                </xs:simpleType>
            </xs:attribute>
            <xs:attribute name="value" use="required">
                <xs:simpleType>
                    <xs:restriction base="xs:string"/>
                </xs:simpleType>
            </xs:attribute>
        </xs:complexType>
    </xs:element>
    <xs:element name="POSs">
        <xs:complexType>
            <xs:sequence>
                <xs:element ref="POS" maxOccurs="unbounded"/>
                <xs:element ref="OptionalPOSs"/>
            </xs:sequence>
        </xs:complexType>
    </xs:element>
    <xs:element name="Plan">
        <xs:complexType>
            <xs:sequence>
                <xs:element ref="FilterRule" maxOccurs="unbounded"/>
            </xs:sequence>
            <xs:attribute name="name" use="required">
                <xs:simpleType>
                    <xs:restriction base="xs:string"/>
                </xs:simpleType>
            </xs:attribute>
            <xs:attribute name="value" use="required">
                <xs:simpleType>
                    <xs:restriction base="xs:string"/>
                </xs:simpleType>
            </xs:attribute>
        </xs:complexType>
    </xs:element>
    <xs:element name="ProviderSpeciality">
        <xs:complexType>
            <xs:attribute name="name" use="required">
                <xs:simpleType>
                    <xs:restriction base="xs:string"/>
                </xs:simpleType>
            </xs:attribute>
            <xs:attribute name="value" use="required">
                <xs:simpleType>
                    <xs:restriction base="xs:string"/>
                </xs:simpleType>
            </xs:attribute>
        </xs:complexType>
    </xs:element>
</xs:schema>
```

Example of Descriptors Used for a Hospital's Eligibility and Benefits (EB) Personalization Profile The following example represents a section of code that uses the schema given above to provide a portion of a personalized eligibility and benefits profile for a hospital.

```xml
<?xml version="1.0" encoding="UTF-8"?>
<FilterRules name="HCAFilterRule" xmlns:xsi="http://www.w3.org/2001/XMLSchema-instance" xsi:noNamespaceSchemaLocation="filterrules.xsd">
    <Plan name="plan" value="IN">
        <FilterRule>
            <BenefitText>SURGERY</BenefitText>
            <POSs>
                <POS name="pos1" value="O/P"/>
                <POS name="pos2" value="ALL"/>
                <OptionalPOSs>
                    <OptionalPOS name="opos1" value="XB"/>
                    <OptionalPOS name="opos2" value="XF"/>
                </OptionalPOSs>
            </POSs>
            <ProviderSpeciality name="provspec" value="ALL;BlankEntry=Required">
                <!--
                    Provider Speciality Group can have ALL or specifics. For e.g.
                    NONE;BlankEntry=Required
                    StartsWith=GP;BlankEntry=NotRequired
                -->
            </ProviderSpeciality>
            <BenefitCodes>
                <BenefitCode name="bc1" value="A">
                    <FilteringLogic>Everything</FilteringLogic>
                </BenefitCode>
                <BenefitCode name="bc2" value="B">
                    <FilteringLogic>Everything</FilteringLogic>
                </BenefitCode>
                <BenefitCode name="bc3" value="C">
                    <FilteringLogic>Everything</FilteringLogic>
                </BenefitCode>
            </BenefitCodes>
        </FilterRule>
        <FilterRule>
            <BenefitText>SURGERY</BenefitText>
            <POSs>
                <POS namd="pos1" value="I/P"/>
                <POS name="pos2" value="ALL"/>
                <OptionalPOSs>
                    <OptionalPOS name="opos1" value="XB"/>
                    <OptionalPOS name="opos2" value="XF"/>
                </OptionalPOSs>
            </POSs>
            <ProviderSpeciality name="provspec" value="ALL;BlankEntry=Required">
                <!--
                    Provider Speciality Group can have ALL or specifics. For e.g.
                    NONE;BlankEntry=Required
                    StartsWith=GP;BlankEntry=NotRequired
                -->
            </ProviderSpeciality>
            <BenefitCodes>
                <BenefitCode name="bc1" value="A">
                    <FilteringLogic>Everything</FilteringLogic>
                </BenefitCode>
                <BenefitCode name="bc2" value="B">
                    <FilteringLogic>Everything</FilteringLogic>
                </BenefitCode>
                <BenefitCode name="bc3" value="C">
                    <FilteringLogic>Everything</FilteringLogic>
                </BenefitCode>
            </BenefitCodes>
        </FilterRule>
        <FilterRule>
            <BenefitText>EMERGENCY ROOM VISIT</BenefitText>
            <POSs>
                <POS name="pos1" value="O/P"/>
                <POS name="pos2" value="ALL"/>
                <OptionalPOSs>
                    <OptionalPOS name="opos1" value="XB"/>
```

-continued

```
                        <OptionalPOS name="opos2" value="XF"/>
                    </OptionalPOSs>
                </POSs>
                <ProviderSpeciality name="provspec"
value="ALL;BlankEntry=Required">
                    <!--
                                        Provider Speciality Group can have ALL
or specifics. For e.g.
                                        NONE;BlankEntry=Required
                                        StartsWith=GP;BlankEntry=NotRequired
                                    -->
                </ProviderSpeciality>
                <BenefitCodes>
                    <BenefitCode name="bc1" value="A">
                        <FilteringLogic>Everything</FilteringLogic>
                    </BenefitCode>
                    <BenefitCode name="bc2" value="B">
                        <FilteringLogic>Everything</FilteringLogic>
                    </BenefitCode>
                    <BenefitCode name="bc3" value="C">
                        <FilteringLogic>Everything</FilteringLogic>
                    </BenefitCode>
                </BenefitCodes>
            </FilterRule>
            <FilterRule>
                <BenefitText>FCLTY XRAY (NOT MRI, MRA,
PETSCAN)</BenefitText>
                <POSs>
                    <POS name="pos1" value="O/P"/>
                    <POS name="pos2" value="ALL"/>
                    <OptionalPOSs>
                        <OptionalPOS name="opos1" value="XB"/>
                        <OptionalPOS name="opos2" value="XF"/>
                    </OptionalPOSs>
                </POSs>
                <ProviderSpeciality name="provspec"
value="ALL;BlankEntry=Required">
                    <!--
                                        Provider Speciality Group can have ALL
or specifics. For e.g.
                                        NONE;BlankEntry=Required
                                        StartsWith=GP;BlankEntry=NotRequired
                                    -->
                </ProviderSpeciality name>
                <BenefitCodes>
                    <BenefitCode name="bc1" value="A">
                        <FilteringLogic>Everything</FilteringLogic>
                    </BenefitCode>
                    <BenefitCode name="bc2" value="B">
                        <FilteringLogic>Everything</FilteringLogic>
                    </BenefitCode>
                    <BenefitCode name="bc3" value="C">
                        <FilteringLogic>Everything</FilteringLogic>
                    </BenefitCode>
                </BenefitCodes>
            </FilterRule>
            <FilterRule>
                <BenefitText>INPATIENT PRIVATE R&B</BenefitText>
                <POSs>
                    <POS name="pos1" value="I/P"/>
                    <POS name="pos2" value="ALL"/>
                    <OptionalPOSs>
                        <OptionalPOS name="opos1" value="XB"/>
                        <OptionalPOS name="opos2" value="XF"/>
                    </OptionalPOSs>
                </POSs>
                <ProviderSpeciality name="provspec"
value="ALL;BlankEntry=Required">
                    <!--
                                        Provider Speciality Group can have ALL
or specifics. For e.g.
                                        NONE;BlankEntry=Required
                                        StartsWith=GP;BlankEntry=NotRequired
                                    -->
                </ProviderSpeciality>
                <BenefitCodes>
                    <BenefitCode name="bc1" value="A">
                        <FilteringLogic>Everything</FilteringLogic>
                    </BenefitCode>
                    <BenefitCode name="bc2" value="B">
```

-continued

```xml
            <FilteringLogic>Everything</FilteringLogic>
        </BenefitCode>
        <BenefitCode name="bc3" value="C">
            <FilteringLogic>Everything</FilteringLogic>
        </BenefitCode>
    </BenefitCodes>
</FilterRule>
<FilterRule>
    <BenefitText>INPATIENT ROOM & BOARD</BenefitText>
    <POSs>
        <POS name="pos1" value="I/P"/>
        <POS name="pos2" value="ALL"/>
        <OptionalPOSs>
            <OptionalPOS name="opos1" value="XB"/>
            <OptionalPOS name="opos2" value="XF"/>
        </OptionalPOSs>
    </POSs>
    <ProviderSpeciality name="provspec" value="ALL;BlankEntry=Required">
        <!--
                        Provider Speciality Group can have ALL or specifics. For e.g.
                        NONE;BlankEntry=Required
                        StartsWith=GP;BlankEntry=NotRequired
        -->
    </ProviderSpeciality>
    <BenefitCodes>
        <BenefitCode name="bc1" value="A">
            <FilteringLogic>Everything</FilteringLogic>
        </BenefitCode>
        <BenefitCode name="bc2" value="B">
            <FilteringLogic>Everything</FilteringLogic>
        </BenefitCode>
        <BenefitCode name="bc3" value="C">
            <FilteringLogic>Everything</FilteringLogic>
        </BenefitCode>
    </BenefitCodes>
</FilterRule>
<FilterRule>
    <BenefitText>INPATIENT SEMIPRIVATE R&B</BenefitText>
    <POSs>
        <POS name="pos1" value="I/P"/>
        <POS name="pos2" value="ALL"/>
        <OptionalPOSs>
            <OptionalPOS name="opos1" value="XB"/>
            <OptionalPOS name="opos2" value="XF"/>
        </OptionalPOSs>
    </POSs>
    <ProviderSpeciality name="provspec" value="ALL;BlankEntry=Required">
        <!--
                        Provider Speciality Group can have ALL or specifics. For e.g.
                        NONE;BlankEntry=Required
                        StartsWith=GP;BlankEntry=NotRequired
        -->
    </ProviderSpeciality>
    <BenefitCodes>
        <BenefitCode name="bc1" value="A">
            <FilteringLogic>Everything</FilteringLogic>
        </BenefitCode>
        <BenefitCode name="bc2" value="B">
            <FilteringLogic>Everything</FilteringLogic>
        </BenefitCode>
        <BenefitCode name="bc3" value="C">
            <FilteringLogic>Everything</FilteringLogic>
        </BenefitCode>
    </BenefitCodes>
</FilterRule>
<FilterRule>
    <BenefitText>INPATIENT VISIT</BenefitText>
    <POSs>
        <POS name="pos1" value="I/P"/>
        <POS name="pos2" value="ALL"/>
        <OptionalPOSs>
            <OptionalPOS name="opos1" value="XB"/>
            <OptionalPOS name="opos2" value="XF"/>
        </OptionalPOSs>
    </POSs>
```

```xml
            <ProviderSpeciality name="provspec" value="ALL;BlankEntry=Required">
                <!--
                                        Provider Speciality Group can have ALL or specifics. For e.g.
                                        NONE;BlankEntry=Required
                                        StartsWith=GP;BlankEntry=NotRequired
                                -->
            </ProviderSpeciality>
            <BenefitCodes>
                <BenefitCode name="bc1" value="A">
                    <FilteringLogic>Everything</FilteringLogic>
                </BenefitCode>
                <BenefitCode name="bc2" value="B">
                    <FilteringLogic>Everything</FilteringLogic>
                </BenefitCode>
                <BenefitCode name="bc3" value="C">
                    <FilteringLogic>Everything</FilteringLogic>
                </BenefitCode>
            </BenefitCodes>
        </FilterRule>
        <FilterRule>
            <BenefitText>DEDUCTIBLE</BenefitText>
            <ProviderSpeciality name="provspec" value="ALL;BlankEntry=Required">
                <!--
                                        Provider Speciality Group can have ALL or specifics. For e.g.
                                        NONE;BlankEntry=Required
                                        StartsWith=GP;BlankEntry=NotRequired
                                -->
            </ProviderSpeciality>
            <BenefitCodes>
                <BenefitCode name="bc1" value="C">
                    <FilteringLogic>Mimimum</FilteringLogic>
                </BenefitCode>
            </BenefitCodes>
        </FilterRule>
        <FilterRule>
            <BenefitText>OUT OF POCKET</BenefitText>
            <ProviderSpeciality name="provspec" value="ALL;BlankEntry=Required">
                <!--
                                        Provider Speciality Group can have ALL or specifics. For e.g.
                                        NONE;BlankEntry=Required
                                        StartsWith=GP;BlankEntry=NotRequired
                                -->
            </ProviderSpeciality>
            <BenefitCodes>
                <BenefitCode name="bc1" value="G">
                    <FilteringLogic>Mimimum</FilteringLogic>
                </BenefitCode>
            </BenefitCodes>
        </FilterRule>
    </Plan>
    <Plan name="plan2" value="HM">
        <FilterRule>
            <BenefitText>ER FACILITY</BenefitText>
            <BenefitCodes>
                <BenefitCode name="bc1" value="A"/>
                <BenefitCode name="bc2" value="B"/>
            </BenefitCodes>
        </FilterRule>
        <FilterRule>
            <BenefitText>O/P FAC NONSURG</BenefitText>
            <BenefitCodes>
                <BenefitCode name="bc1" value="A"/>
                <BenefitCode name="bc2" value="B"/>
            </BenefitCodes>
        </FilterRule>
        <FilterRule>
            <BenefitText>O/P FAC SURG</BenefitText>
            <BenefitCodes>
                <BenefitCode name="bc1" value="A"/>
                <BenefitCode name="bc2" value="B"/>
            </BenefitCodes>
        </FilterRule>
```

-continued

```
<FilterRule>
        <BenefitText>IP FACILITY</BenefitText>
    <BenefitCodes>
            <BenefitCode name="bc1" value="A"/>
            <BenefitCode name="bc2" value="B"/>
        </BenefitCodes>
    </FilterRule>
    <FilterRule>
        <BenefitText>COINS IN PLAN</BenefitText>
        <BenefitCodes>
            <BenefitCode name="bc1" value="A"/>
        </BenefitCodes>
    </FilterRule>
    <FilterRule>
        <BenefitText>ANNUAL MAX/ MEMBER</BenefitText>
        <BenefitCodes>
            <BenefitCode name="bc1" value="G"/>
        </BenefitCodes>
    </FilterRule>
    </Plan>
</FilterRules>
```

What is claimed is:

1. A method of automatically supplying personalized requests from health care providers for eligibility data from insurance companies comprising:
storing computer-readable eligibility and benefits filtering rules in a filtering rules database that is accessible by a server computer, where the eligibility and benefits filtering rules are based upon information specified by a participating insurance company;
storing computer-readable personalization profiles accessible by the server computer, for each participating health care provider, where each personalization profile is based on at least one of corresponding personalized parameters and variables received from a corresponding health care provider;
receiving a request at the server computer across a computer network from a select health care provider's computer for personalized eligibility and benefits data that is associated with at least one selected insurance company;
applying information from the personalization profile associated with the select health care provider to select a corresponding set of the eligibility and benefits rules from the filtering rules database;
obtaining by the server computer, a collection of eligibility data from each selected insurance company;
generating by the server computer, the personalized eligibility and benefits data by using the corresponding set of eligibility and benefits filtering rules from the filtering rules database to select a subset of the collection of eligibility data to send to the select health care provider; and
transmitting the subset of eligibility data from the server computer to the select health care provider's computer across the network.

2. A system for supplying personalized requests from health care providers for eligibility data from insurance companies comprising:
at least one portal Web page hosted by a server computer, wherein the at least one portal Web page allows operators to specify at least one of personalized parameters and/or variables for participating health care providers;
at least one data storage device accessible by the server computer, the at least one data storage device storing:
a computer-readable filtering rules database that contains computer-readable eligibility and benefits filtering rules based upon information specified by a participating insurance company; and
computer-readable personalization profiles for each participating health care provider;
wherein the server computer provides eligibility and benefits information to health care providers by:
receiving a request at the server computer from across a computer network, where the received request is from a select health care provider for personalized eligibility and benefits data that is associated with at least one selected insurance company;
applying information from the personalization profile associated with the select health care provider to select a corresponding set of the eligibility and benefits rules from the filtering rules database;
obtaining by the server computer a collection of eligibility and benefits data from each selected insurance company;
generating by the server computer, the personalized eligibility and benefits data by using the corresponding set of eligibility and benefits filtering rules from the filtering rules database to select a subset of the collection of eligibility data to send to the select health care provider; and
transmitting the subset of eligibility data from the server computer to the select health care provider's computer across the network.

3. A computer program product to automatically supply personalized requests from health care providers for eligibility data from insurance companies comprising:
a computer readable storage medium having computer readable program code embodied therewith, the computer readable program code comprising:
computer readable program code configured to store computer-readable eligibility and benefits filtering rules in a filtering rules database that is accessible by a server computer, where the eligibility and benefits filtering rules are based upon information specified by a participating insurance company;
computer readable program code configured to store computer-readable personalization profiles accessible by the server computer, for each participating health care provider, where each personalization profile is based on at least one of corresponding personalized parameters and variables received from a corresponding health care provider;

computer readable program code configured to receive a request at the server computer across a computer network from a select health care provider's computer for personalized eligibility and benefits data that is associated with at least one selected insurance company;

computer readable program code configured to apply information from the personalization profile associated with-the select health care provider to select a corresponding set of the eligibility and benefits rules from the filtering rules database;

computer readable program code configured to obtain by the server computer, a collection of eligibility data from each of the at least one selected insurance company;

computer readable program code configured to generate by the server computer, personalized eligibility and benefits data by using the corresponding set of eligibility and benefits filtering rules from the filtering rules database to select a subset of the collection of eligibility data to send to the select health care provider; and computer readable program code configured to transmit the subset of eligibility data from the server computer to the select health care provider's computer across the network.

4. The method of claim 1, wherein storing computer-readable personalization profiles comprises expressing the personalization profiles as a plurality of characterizations such that each characterization represents a selection of attribute values or attribute value ranges for at least one group of personalization attributes, and associating each group of personalization attributes with a dimension of personalization.

5. The method of claim 1, further comprising providing by the server computer, a portal web page that allows health care providers to log in to the server computer to self personalize their corresponding personalization profiles by selecting a group of personalization attributes with default values and editing at least one default value in the group of personalization attributes.

6. The method of claim 1, wherein storing computer-readable personalization profiles further comprises setting up the personalization profiles for each participating health care provider according to descriptors, wherein the descriptors comprise a plurality of age ranges.

7. The method of claim 1, further comprising providing by the server computer, a portal web page that allows health care providers to log in to the server computer using the portal Web page to update an associated one of the eligibility and benefits personalization profiles accessible by the server.

8. The method according to claim 1, further comprising expressing personalization profiles for the eligibility of health care providers by:
   defining a set of dimensions of personalization;
   defining, for a health care provider, at least one group of personalization attributes for each dimension of personalization; and
   selecting, for the health care provider, a characterization comprising a desired value or value range for each attribute in the at least one group of personalization attributes.

9. The method of claim 8, wherein defining a set of dimensions of personalization further comprises selecting each dimension of personalization from at least one of co-payment provisions, eligibility requirements, amount of coverage, and network definition.

10. The method of claim 8, wherein defining, for a health care provider, at least one group of personalization attributes for each dimension of personalization further comprises selecting the at least one group of personalization attributes for each dimension of personalization from at least one of type of benefit, place of service, type of service, provider specialty, and age group.

11. The method of claim 8, further comprising enabling a health care provider to self-personalize its personalization profiles by selecting an appropriate group of personalization attributes with default values, and editing at least one default value in the at least one group of personalization attributes.

12. The computer program product according to claim 3, wherein the computer readable program code configured to store computer-readable personalization profiles comprises computer readable program code configured to express the personalization profiles as a plurality of characterizations such that each characterization represents a selection of attribute values or attribute value ranges for at least one group of personalization attributes, and associating each group of personalization attributes with a dimension of personalization.

13. The computer program product according to claim 3, further comprising computer readable program code configured to provide by the server computer, a portal web page that allows health care providers to log in to the server computer to self personalize their corresponding personalization profiles by selecting a group of personalization attributes with default values and editing at least one default value in the group of personalization attributes.

14. The computer program product according to claim 3, wherein the computer readable program code configured to store computer-readable personalization profiles further comprises computer readable program code configured to set up the personalization profiles for each participating health care provider according to descriptors, wherein the descriptors comprise a plurality of age ranges.

15. The computer program product according to claim 3, further comprising computer readable program code configured to provide by the server computer, a portal web page that allows health care providers to log in to the server computer using the portal Web page to update an associated one of the eligibility and benefits personalization profiles accessible by the server.

16. The computer program product according to claim 3, further comprising computer readable program code configured to express personalization profiles for the eligibility of health care providers by:
   defining a set of dimensions of personalization;
   defining, for a health care provider, at least one group of personalization attributes for each dimension of personalization; and
   selecting, for the health care provider, a characterization comprising a desired value or value range for each attribute in the at least one group of personalization attributes.

17. The computer program product according to claim 16, wherein the computer readable program code configured for defining a set of dimensions of personalization further comprises computer readable program code configured to select each dimension of personalization from at least one of co-payment provisions, eligibility requirements, amount of coverage, and network definition.

18. The computer program product according to claim 16, wherein the computer readable program code configured for defining, for a health care provider, at least one group of personalization attributes for each dimension of personalization further comprises computer readable program code configured to select the at least one group of personalization attributes for each dimension of personalization from at least one of type of benefit, place of service, type of service, provider specialty, and age group.

19. The computer program product according to claim 16, further comprising computer readable program code configured to enable a health care provider to self-personalize its personalization profiles by selecting an appropriate group of personalization attributes with default values, and editing at least one default value in the at least one group of personalization attributes.

* * * * *